United States Patent [19]

Fayolle

[11] 4,311,824

[45] Jan. 19, 1982

[54] THERMOTROPIC ALKYLAROMATIC COPOLYESTERS

[75] Inventor: Bernard Fayolle, Ecully, France

[73] Assignee: Rhone-Poulenc Industries, France

[21] Appl. No.: 78,719

[22] Filed: Sep. 25, 1979

[30] Foreign Application Priority Data

Oct. 5, 1978 [FR] France .................. 78 28947

[51] Int. Cl.$^3$ .................................. C08G 63/40
[52] U.S. Cl. .................. 528/190; 525/444;
528/191; 528/193; 528/194; 528/271
[58] Field of Search ............... 528/190, 191, 193, 194,
528/271; 525/444

[56] References Cited

U.S. PATENT DOCUMENTS

| | | | |
|---|---|---|---|
| 3,991,013 | 11/1976 | Pletcher | 528/194 |
| 4,064,108 | 12/1977 | Inata et al. | 528/194 |
| 4,066,620 | 1/1978 | Kleinschuster et al. | 528/193 |
| 4,118,372 | 10/1978 | Schaefgen | 528/193 |
| 4,171,421 | 10/1979 | Buxbaum | 528/194 |

FOREIGN PATENT DOCUMENTS 1507207  4/1978  United Kingdom .
1508646  4/1978  United Kingdom .

*Primary Examiner*—Harold D. Anderson
*Attorney, Agent, or Firm*—Stevens, Davis, Miller & Mosher

[57] ABSTRACT

High molecular weight thermotropic copolyesters are disclosed which can be shaped. These copolyesters consist or consist essentially of units of the formulae:

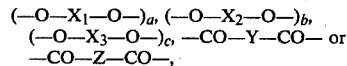

in which: $X_1$ represents a monosubstituted para-phenylene radical; $X_2$ represents an unsubstituted 1,4-phenylene radical; and $X_3$ represents a disubstituted para-phenylene radical, a 4,4'-diphenylene radical or a p,p'-diphenylene ether radical, where $0.4 \leq a \leq 1$, $0 \leq b \leq 0.6$, $0 \leq c \leq 0.1$ and $a+b+c=1$; Y represents a 1,4-cyclohexylene radical, a radical having two phenylene groups joined to one another by a single bond or an acyclic chain, or a divalent aromatic radical having at least two fused phenyl nuclei; and Z represents a radical $-(CH_2)_n-$, in which $3 \leq n \leq 10$, the molar ratio $Z/Y+Z$ being between 0.2 and 0.5. These copolyesters may be made up into molded articles, threads, films, etc.

9 Claims, No Drawings

THERMOTROPIC ALKYLAROMATIC COPOLYESTERS

The present invention relates to high molecular weight thermotropic alkylaromatic copolyesters.

It is already known, according to French Pat. No. 1,547,346, to prepare polyesters of high heat stability from halogen-containing diphenols and aliphatic, cycloaliphatic and/or aromatic dicarboxylic acid chlorides, it being possible to use the said polyesters as lacquers, coatings, insulating materials and materials for molding. However, the polymers prepared according to the examples of the above-mentioned patent all originate from halogen derivatives of 2,2-bis-(p-hydroxyphenyl)-propane and are not capable of giving anisotropic melts.

It is also known, according to French Application No. 2,270,282, to prepare polyesters originating from one or more diphenols and one or more aromatic and/or cycloaliphatic diacids, which polyesters are capable of forming an anisotropic melt from which oriented filaments can be formed by extrusion in the molten state. However, this family of polyesters is restricted; they are advantageously modified in order to achieve an advantageous melting point without losing the rigidity which is characteristic of these cyclic polyesters and required for anisotropy; one of the modifications envisaged consists in introducing a limited degree of flexibility between the nuclei, for example by means of ether bonds and/or aliphatic chains of limited length.

A few examples of these chains are given in French Application Nos. 2,270,282 and 2,270,074: In French Application No. 2,270,282, only one example of a compound containing an aliphatic chain is provided. That compound is 1,2-(p,p'-dicarboxydiphenoxy)-ethane, in which the aromatic nuclei are joined by a chain of 4 atoms (—OCH$_2$—CH$_2$—O—) and the use of which is restricted to terpolymers and tetrapolymers. However, according to Kamide, Miyazaki and Kobayachi (Polymer J., 1977, 9 (3), 317-27), this diacid seems in reality to be more rigid than terephthalic acid, with which it is compared in the form of a homopolyester with ethylene glycol.

In French Application No. 2,270,074, the acyclic chains introduced into the same type of polyester can have even shorter chains containing 2 and 3 atoms (—O—CH$_2$— and —O—CH$_2$—O—). The limited length of the acyclic chains can be explained by the fact that polyesters of diphenols and of aliphatic diacids do not give anisotropic melts.

It has now been found that it is possible to reduce the rigidity of cyclic polyesters whilst retaining their characteristics of anisotropy in the molten state, and to do this without unduly lowering the melting point of the said copolyesters, by introducing a relatively high degree of flexibility into the molecular chains by means of acyclic chains containing at least 7 atoms.

The present invention relates to high molecular weight thermotropic copolyesters which can be shaped, characterized in that they possess an inherent viscosity of at least 0.5 (measured on a solution containing 0.5 g/100 cm$^3$ in a solvent mixture (50/50 by volume) of p-chlorophenol/1,2-dichloroethane); in that they have a flow point which is greater than or equal to 150° C.; and in that they consist or consist essentially of units of the formulae:

(—O—X$_1$—O—)$_a$, (—O—X$_2$—O—)$_b$, (—O—X$_3$—O—)$_c$, —CO—Y—CO—, or —CO—Z—CO—, in which formulae X$_1$ represents a para-phenylene radical monosubstituted by a methyl or ethyl group or a chlorine or bromine atom; X$_2$ represents an unsubstituted 1,4-phenylene radical; and X$_3$ represents a 1,4-phenylene radical disubstituted by two methyl or ethyl groups or two chlorine or bromine atoms, or a 4,4'-diphenylene or p,p'-diphenylene ether radical, in which each aromatic nucleus may be substituted by a methyl or ethyl group or a chlorine or bromine atom, where $0.4 \leq a \leq 1$ $0 \leq b \leq 0.6$ $0 \leq c \leq 0.1$ and $a+b+c=1$;

Y represents:

a 1,4-phenylene or 1,4-cyclohexylene radical;

a radical containing two 4,4'-diphenylene groups which may be joined to one another by a single bond or an acyclic chain which may contain up to 8 carbon atoms and optionally one or two hetero-atoms (in particular oxygen). Examples of acyclic chains which may be mentioned are alkylene radicals, such as methylene, ethylene, 1,3-propylene, 1,4-butylene and 1,8-octylene, which are optionally bonded to the phenylene groups via hetero-atoms such as oxygen; or a divalent aromatic radical containing at least two fused phenyl nuclei, in which radical the bonds attached to the carbonyl groups are opposite and parallel, such as 2,6-naphthylene, 1,5-naphthylene, and 1,4-naphthylene groups; and Z represents a radical —(CH$_2$)$_n$—, in which $3 \leq n \leq 10$, the molar ratio of Z/Y+Z being between 0.2 and 0.5.

The units of the formula —O—X$_1$—O— originate from monosubstituted derivatives of hydroquinone, used by themselves or in admixture with one another. The monosubstituted derivatives of hydroquinone can also be used as a mixture with up to 60 mol. % of hydroquinone, relative to the total amount of diphenols, or with up to 10 mol. % of a diphenol taken from the group comprising (a) disubstituted derivatives of hydroquinone containing methyl or ethyl groups and/or chlorine and/or bromine atoms;

(b) 4,4'-dihydroxybiphenyl optionally containing one methyl or ethyl group or one chlorine or bromine atom per aromatic nucleus; and (c) 4,4'-dihydroxydiphenyl ether optionally containing one methyl or ethyl radical or one chlorine or bromine atom per aromatic nucleus.

Specific examples which may be mentioned of diphenols giving rise to the units of the formula (—O—X$_1$—O—) are 3,6-dihydroxytoluene, 3,6-dihydroxyethylbenzene and 3,6-dihydroxychlorobenzene.

Amongst the diphenols capable of generating the units of the formula (—O—X$_3$—O—), there may be mentioned, by way of illustration: 3,6-dihydroxy-1,2-dichlorobenzene, 3,6-dihydroxy-1,4-dichlorobenzene, 3,6-dihydroxy-ortho-xylene, 3,4-dihydroxy-paraxylene, 2,5-dihydroxy-3-chlorotoluene, 4,4'-dihydroxybiphenyl, 2-methyl-4,4'-dihydroxybiphenyl, 3-methyl-4,4'- dihydroxybiphenyl, 2,2'-dimethyl-4,4'-dihydroxybiphenyl, 2-chloro-4,4'-dihydroxybiphenyl, 2,2'-dichloro-4,4'-dihydroxybiphenyl, 2-methyl-3'-chlorodihydroxybiphenyl, bis-(2-methyl-4-hydroxyphenyl) ether, 1-hydroxy-3-methylphenyl 4-hydroxyphenyl ether, 2-chloro-4-hydroxyphenyl 3-methyl-4-hydroxyphenyl ether, and bis-(4-hydroxyphenyl) ether.

To prepare the thermotropic copolyesters according to this invention, the above-mentioned diphenols may be employed either in the form of free phenols or in the form of derivatives of the phenol group which are capable of reacting with dicarboxylic acids or their derivatives (for example dihalides). Examples of such phenol derivatives which may be mentioned are their diesters with lower alkanoic acids (acetate, propionate, and butyrate).

Methylhydroquinones or chlorohydroquinones, by themselves or as a mixture with unsubstituted hydroquinone, or their derivatives, are preferably used.

The units —CO—Y—CO— originate from aromatic and/or cycloaliphatic carboxylic diacids or their derivatives, which may be used either by themselves, or as a mixture with one another, or as a mixture with a small proportion of another aromatic and/or cycloaliphatic diacid or their derivatives (for example up to 5 mol. %, or even 10 mol. %, relative to the total amount of diacid compounds), but in which the rings or nuclei are monosubstituted or disubstituted by at least one methyl, ethyl, or methoxy group or at least one chlorine or bromine atom, or contain non-parallel bonds.

The preferred aromatic diacids are terephthalic acid, trans-hexahydroterephthalic acid, 4,4'-dicarboxybiphenyl, 1,2-(p,p'-dicarboxydiphenoxy)-ethane, 1,4-(p,p'-dicarboxydiphenoxy)-butane, 1,6-(p,p'-dicarboxydiphenoxy)-hexane and 2,6-dicarboxynaphthalene. It is also possible to use their derivatives, such as their lower alkyl esters or their chlorides.

Amongst the aliphatic diacids or their derivatives, from which the copolyesters according to the present invention originate, there may be mentioned, more particularly, glutaric acid, sebacic acid, and, preferably, adipic acid. The proportion of these aliphatic diacids or their derivatives is 20 to 50 mol. %, preferably 25 to 50 mol. %, relative to the total amount of the diacids or derivatives from which the polymers originate. Such diacids make it possible to introduce acyclic chains, containing 7 to 14 chain atoms, between two aromatic and/or cycloaliphatic nuclei.

The copolyesters according to the present invention possess a high molecular weight, an inherent viscosity of more than 0.5 dlg$^{-1}$, preferably more than 0.6, and a flow point which is generally between 150° and 330° C. and preferably between 180° C. and 300° C. The flow point is understood as meaning the temperature at which the edges of a sample, in the form of a chip of polymer or chopped fiber, start to become rounded. This temperature is determined by visual observation of the sample on a cover glass placed between crossed polarizers, for a suitable rate of temperature increase which is generally of the order of 20° C./minute, on a microscope equipped with a heating platform, which is known commercially by the trademark "THERMO-PAN" and is manufactured by REICHERT.

The copolyesters according to the present invention possess the characteristic of being thermotropic, that is to say that they are capable of giving anisotropic melts which are easy to shape by extrusion or molding. Thermotropy is easy to demonstrate when the polymer is observed in the molten state in optical systems equipped with crossed polarizers. The polarized light is transmitted and a strong birefringence is created, whereas transmission of the light and birefringence are zero for isotropic products observed in polarized light. The anisotropy of the polyesters according to the present invention was demonstrated by the TOT thermo-optical method described in French Application No. 2,270,282.

Thus, the melts possess an inherent orientation and a relatively high degree of organization, which are found in the shaped articles, such as threads, films and molded articles, and which impart to those articles, even in the crude form, improved properties, such as modulus and tensile strength, which are not usually observed in crude isotropic products.

The molded articles, in particular, possess valuable characteristics in one direction, which are comparable to those of plastics reinforced by glass fibers.

The thermotropic polyesters according to the present invention may be obtained in accordance with any per se known process, for example by reacting acid dichlorides with diphenols by interfacial polycondensation or at high temperature in a solvent medium having a high boiling point. They are preferably prepared in accordance with an acidolysis process, that is to say by reacting diacids with a diphenol diester, and more particularly using a two-stage process involving firstly the reaction of the aliphatic diacid with the diphenol diester in excess, and at a temperature below 250° C., until a degree of conversion $\geq 85\%$ is reached, and then the reaction of the aromatic or cycloaliphatic diacid, at a temperature above 250° C., and polycondensation, as described in the companion French Application No. 78/28 948 entitled "Process for the production of alkyl-aromatic copolyesters.

The following examples, in which the parts are to be understood as being parts by weight, are given by way of indication, but without implying any limitation, in order still further to illustrate the invention.

In these examples:

The thermotropy was demonstrated in the manner indicated above;

The angle of orientation is understood as meaning the length of arc, in degrees, measured at half the maximum intensity of the main equatorial spot used for the said measurement. The spot was chosen in accordance with the information in French Patent No. 2,134,582; the main spot used is that which corresponds to the greatest value of $2\theta$. The distribution curve of the diffraction intensities is measured by azimuthal sweeping of the diffraction arc chosen with the aid of an instrument specially designed for this use, namely the "Joyce and Loebl MK III C Microdensitometer".

The angle of orientation of the fibers examined is measured in accordance with the general description reported in "X-ray Diffraction In Polymer Sciences" by Leroy E. Alexander, Wiley Interscience (1969), chapter 4, page 264.

The inherent viscosity was measured on a solution containing 0.5 g of polymer per 100 cm$^3$ of a solvent mixture (50/50 by volume) of p-chlorophenol/1,2-dichloroethane.

EXAMPLE 1

375.6 parts of methylhydroquinone diacetate, 131.4 parts of adipic acid (50 mol. % relative to the total amount of the diacids), and 0.328 part of magnesium acetate are introduced into a polycondensation reactor equipped with a stirrer and heated by a metal bath.

The apparatus is purged with argon and the reactants are heated with the metal bath to 240° C. The acidolysis reaction starts at between 210° and 220° C. and lasts for 1 hour at atmospheric pressure, the temperature reaching 235° C. The pressure is then lowered to 400 mm of mercury in the course of 5 minutes, so as to avoid entraining the reactants, and is maintained for 10 minutes. 92.6% of the acetic acid theoretically formed is collected.

149.4 parts of terephthalic acid are then introduced and the temperature of the bath is raised to 290° C. The second acidolysis reaction starts at atmospheric pressure, the temperature of the reaction mixture being 270° C. After 45 minutes, the temperature of the reaction mixture reaches 290° C. and is maintained for 1 hour 30 minutes. The pressure is then lowered in stages to 5 mm of mercury and then to 1.2 mm and is maintained for 22 minutes. With the temperature kept at 290° C., the polymer obtained is run into a water bath. The polymer obtained is clear. It has a flow point of 243° C. and an inherent viscosity of 1.15 dlg$^{-1}$ and exhibits anisotropy at temperatures above 243° C.

The copolyester is dried for 6 hours at 150° C. before being injection-molded, at 275°, 280° and 285° C., under a pressure of 3 kg/cm$^2$ and at an average mold temperature of 40° C. (on a KAP machine), to form 2 mm thick dumbbell-shaped bars. The mechanical characteristics measured on these bars are as follows:

Tensile Properties:

| | |
|---|---|
| breaking stress | 6.18 daN/mm$^2$ |
| elongation at break | 4.44% |
| modulus of elasticity | 187 daN/mm$^2$ |

(secant modulus calculated at 50% of the breaking stress). Flexural properties as a function of the molding temperature:

| | Flexural strength in daN/mm$^2$ | Flexural modulus in daN/mm$^2$ |
|---|---|---|
| 275° C. | 13 | 512 |
| 280° C. | 13.4 | 536 |
| 285° C. | 12.2 | 541 |

The Charpy notched impact strength (Standard Specification ISO R 179) is determined on test-pieces molded at 280° C.±3° C. The average resilience is 7.3 kg f/cm/cm$^2$.

EXAMPLE 2

A copolyester is prepared in an identical manner to that described in Example 1 (and with the same starting materials). 93.3% of the acetic acid is collected at the end of the first stage and 99.6% at the end of the second stage, the polycondensation reaction being carried out over a period of 1 hour 15 minutes at 294° C. under a pressure of 1.1 mm of mercury.

The copolymer thus obtained possesses an inherent viscosity of 1.56 dlg$^{-1}$ and a flow point of 279° C., above which it is anisotropic. It is molded under the conditions indicated below.

Compression molding at 280° C. under a pressure of 550 kg/cm$^2$ to give 125×50×3 mm plates from which 10 mm bars are cut. The temperature of deflection under load is determined on these bars in accordance with Standard Specification ISO 75, method A. This temperature is 74°–76° C.

Injection molding on a "KAP" machine to give 70×10×4 mm bars, after drying the polymer for 48 hours at 90° C. under a pressure of 400 mm of mercury and for 6 hours at 150° C. under a pressure of 1 mm of mercury.

| Molding characteristics Temperature | Pressure | Flexural characteristics: Flexural strength daN/mm$^2$ | Flexural modulus daN/mm$^2$ |
|---|---|---|---|
| 285°–295° C. | 8 kg/cm$^2$ | 13 | 305 |

EXAMPLE 3

A copolyester is prepared in an identical manner to the two preceding examples and with the same starting reactants. 93.5% of the acetic acid is collected after the first stage and 96.10% at the end of the acidolysis reaction. The polycondensation reaction is carried out over a total period of 1 hour at 290° C. under a pressure of 1 mm of mercury.

The copolyester obtained possesses an inherent viscosity of 1.21 dlg$^{-1}$ and a flow point of 243° C., above which it is anisotropic. It is injection-molded in the manner indicated in Example 2.

The characteristics of the bars are as follows:

| | |
|---|---|
| Flexural strength | 10.7 daN/mm$^2$ |
| Flexural modulus | 233 daN/mm$^2$ |

EXAMPLE 4

417.4 parts of methylhydroquinone diacetate, 102.2 parts of adipic acid, and 0.368 part of magnesium acetate are introduced into an identical polycondensation reactor to that used in Example 1.

After purging the apparatus with nitrogen, the reaction mixture is heated with a metal bath to 240° C. Acetic acid starts to distil at 233° C. After one hour, the pressure is lowered to 400 mm of mercury. This pressure is maintained for 10 minutes and brought back to atmospheric pressure. The yield of the reaction is 96.25%.

215.8 parts of terephthalic acid are then added and the temperature of the bath is raised to 280° C. After 20 minutes, acetic acid starts to distil again and the reaction is continued for 2 hours 10 minutes. The pressure is then lowered to 5 mm of mercury in the course of 35 minutes, the temperature of the bath being raised to 330° C., and the polycondensation reaction is then carried out for 30 minutes under a pressure of 3 mm of mercury at 325° C.

The polyester obtained, in which the molar proportion of adipic acid is 35%, relative to the total amount of the diacids, possesses an inherent viscosity of 2.01 dlg$^{-1}$ and a flow point of 317° C., above which it is anisotropic.

The ground polymer is dried for 48 hours at 90° C. under a pressure of 400 mm of mercury and then for 6 hours at 150° C. under a pressure of 1mm of mercury, and is then molded in two different ways.

Compression molding on a "Carver" machine (temperature 300° C., pressure 550 kg/cm$^2$) to give 10 mm bars on which the temperature of deflection under load is determined. This temperature is 100° C. (Standard Specification ISO 75, method A).

*Injection molding* on a "KAP" machine (temperature 330° C., pressure 8 kg/cm$^2$), in a mold kept at 40° C., to give bars of dimensions: 70×10×4 mm.

| Flexural modulus daN/mm$^2$ | Flexural strength daN/mm$^2$ |
|---|---|
| 320 | 7.5 |

EXAMPLE 5

A copolyester originating from methylhydroquinone, adipic acid, and terephthalic acid, using 50 mol. % of each diacid, is prepared in the manner indicated in Example 3 and has an inherent viscosity of 1.27 dlg$^{-1}$ and a flow point of 250° C., above which it is anisotropic. The polyester was converted by extrusion.

Extrusion is carried out by means of a capillary rheometer equipped with a die having a hole of diameter 0.23 mm. The throughput is 0.1343 g/minute and the extrusion temperature is 293° C. This gives a thread which is taken up at a speed of 135 m/minute. The thread obtained crude from extrusion, that is to say immediately after extrusion, without having been subjected to any other treatment such as drawing or a heat treatment, possesses the following characteristics (measured on an individual strand):

| gauge | 11 dtex |
|---|---|
| tenacity | 11.9 cN/tex |
| elongation | 1.52% |
| Young's modulus | 872 cN/tex |
| angle of orientation | (2 $\ominus$ = 19.5°) : 19.4°. |

This thread is then treated successively for 1 hour at 230° C., 1 hour at 247° C., and 1 hour at 257° C. It then possesses the following characteristics:

| gauge | 10.1 dtex |
|---|---|
| tenacity | 29.8 cN/tex |
| Young's modulus | 959 cN/tex |
| angle of orientation | (2 $\ominus$ = 19.5°) : 12.2°. |

The value of the angle of orientation demonstrates that there is orientation of the filaments despite the low extrusion speed and the high proportions of aliphatic chains.

The purpose of the heat treatment of the threads in the essentially relaxed state is to maintain, or even to reduce, the angle of orientation, that is to say, to increase the initial orientation of the threads.

EXAMPLE 6

An acidolysis reaction is carried out under the conditions indicated in the preceding examples, using the following reactants:

| chlorohydroquinone acetate | 412 parts |
|---|---|
| adipic acid | 131.4 parts |
| magnesium acetate | 0.346 parts |
| Yield of the reaction : 100%. | |

149.4 parts of terephthalic acid are then added in order to give a copolyester consisting of 50 mol. % of adipic acid, relative to the total amount of diacids.

The copolyester has an inherent viscosity of 0.95 dlg$^{-1}$, measured as indicated above. Its flow point is 248° C., above which it is anisotropic. After drying in the manner indicated in Example 3, the polyester is injection-molded and compression-molded.

| Compression molding on a "Carver" machine | | | |
|---|---|---|---|
| | | Flexural properties | |
| Molding temperature | Pressure | Flexural strength (daN/mm$^2$) | Flexural modulus (daN/mm$^2$) |
| 269° C. | 550 kg/cm$^2$ | 4.48 | 221 |
| 260° C. | 550 kg/cm$^2$ | 4.02 | 220 |
| 250° C. | 550 kg/cm$^2$ | 4.51 | 239 |

Injection molding on a "KAP" machine

This is carried out at 282° C. under a pressure of 4 kg/cm$^2$ to give bars of dimensions 70×10×4 mm.

| Flexural strength (daN/mm$^2$) | Flexural modulus (daN/mm$^2$) |
|---|---|
| 10.1 | 263 |

EXAMPLE 7

247.3 parts of chlorohydroquinone diacetate, 139.7 parts of hydroquinone diacetate, 131.4 parts of adipic acid, and 0.092 part of magnesium acetate are introduced into an identical reactor to that of Example 1.

The apparatus is purged with nitrogen and, with the metal bath kept at 240° C., it is observed that acetic acid distils at 221° C. After one hour, the pressure is lowered to 400 mm of mercury and is maintained for 10 minutes. Yield of the reaction: 100%. Total duration: 1 hour 25 minutes.

149.4 parts of terephthalic acid are then introduced and acetic acid starts to distil again when the temperature of the reaction mixture reaches 268° C. At the end of this acidolysis stage, the temperature is raised to 290° C. and the pressure is gradually lowered. The polycondensation reaction is carried out over a period of 30 minutes at 292° C. under a pressure of 3 mm of mercury.

The copolyester thus obtained, which consists of 40 mol. % of hydroquinone and 60% of chlorohydroquinone, and of adipic acid and terephthalic acid in molar proportions which are identical to one another, possesses a flow point of 287° C., above which it is anisotropic. It is ground and dried for 48 hours at 90° C. under a pressure of 400 mm mercury and then for 6 hours at 150° C. under a pressure of 1 mm of mercury.

Injection molding on a KAP machine at between 280° C. and 300° C., with a mold kept at an average temperature of 40° C., gives bars of dimensions 70×10×4 mm, having the following flexural characteristics:

| Flexural strength daN/mm$^2$ | Flexural modulus daN/mm$^2$ |
|---|---|
| 8.4 | 251 |

EXAMPLE 8

208.7 parts of methylhydroquinone diacetate, 66.06 parts of glutaric acid, and 0.127 part of magnesium acetate are introduced into an identical reactor to those of the preceding examples.

The apparatus is purged with nitrogen and the temperature of the bath is raised to 245° C. Acetic acid starts to distil at 220° C. and this lasts for 2 hours, the pressure being lowered (400 mm of mercury) and this pressure being maintained for 10 minutes at 240° C.

83 parts of terephthalic acid are then introduced and the temperature of the metal bath is raised to 270° C. Distillation resumes when the mixture reaches 267° C.

The distillation of acetic acid lasts for 2 hours 35 minutes. The pressure is then lowered to 1.5 mm of mercury in the course of 35 minutes and the polycondensation reaction is carried out over a period of 30 minutes at 293° C. under a pressure of 1.5 mm of mercury. This gives a copolyester having a flow point of 220° C., above which it is anisotropic.

The copolyester is dried in the manner indicated in Example 6 and then injection-molded on a KAP machine to give bars of dimensions 70×10×4 mm.

| Molding conditions Temperature of | | Flexural characteristics daN/mm² | |
|---|---|---|---|
| the mold | Pressure | Strength | Modulus |
| 45° C. | 4 kg/cm² | 2.67 | 157 |

EXAMPLE 9

104.35 parts of methylhydroquinone diacetate, 50.5 parts of sebacic acid, and 0.098 part of magnesium acetate are introduced into an identical reactor to that of Example 1.

The acidolysis reaction starts at 243° C. It lasts for 1 hour 15 minutes and, during the last ten minutes, it is carried out under a reduced pressure of 400 mm of mercury.

41.5 parts of terephthalic acid are then introduced and the acidolysis reaction resumes at 275° C. The distillation lasts for 2 hours 15 minutes and the pressure is then gradually lowered in the course of 30 minutes. The polycondensation reaction is carried out at 288° C. over a period of 10 minutes under a pressure of 2 mm of mercury.

The copolyester obtained, which contains 50 mol. % of sebacic acid, relative to the total amount of the diacids, has an inherent viscosity of 0.98 and a flow point of 79° C., above which it is anisotropic.

| | EXAMPLES 10 to 14 | | | | |
|---|---|---|---|---|---|
| Reactants in parts | Ex. 10 | Ex. 11 | Ex. 12 | Ex. 13 | Ex. 14 |
| methylhydroquinone diacetate | 24.96 | 24.96 | 24.96 | 166.4 | 166.4 |
| adipic acid | 3.5 | 5.25 | 7 | 58.4 | 58.4 |
| magnesium acetate | 0.023 | 0.023 | 0.023 | 0.173 | 0.161 |

Acetic acid starts to distil at 224° C. and this lasts for a total of 1 hour 15 minutes. During the last ten minutes, it is carried out under a reduced pressure of 350 mm of mercury.

An aromatic or cycloaliphatic acid is then added as indicated below:

| Ex. 10: hexahydroterephthalic acid | 16.52 parts |
|---|---|
| Ex. 11: hexahydroterephthalic acid | 14.45 parts |
| Ex. 12: hexahydroterephthalic acid | 12.38 parts |
| Ex. 13: 1,2-(4,4'-dicarboxydiphenoxy)-ethane | 120.8 parts |

-continued

| Ex. 14: 4,4'-dicarboxybiphenyl | 96.8 parts |
|---|---|

The acidolysis reaction resumes at 250° C. and lasts for 2 hours 15 minutes. The pressure is then lowered gradually in the course of 30 minutes, and the polycondensation reaction is carried out at 290° C. over a period of 30 minutes under a pressure of 3.4 mm of mercury.

The copolyesters thus obtained have the following characteristics:

| Example | Molar proportion of aliphatic diacid | Inherent viscosity dlg⁻¹ | Softening point | Flow point |
|---|---|---|---|---|
| 10 | 20% | 2.89 | 298° C. | 315° C. |
| 11 | 30% | insoluble | 288° C. | 285° C. |
| 12 | 40% | 0.91 | 235° C. | 235° C. |
| 13 | 50% | 0.63 | 209° C. | 280° C. |
| 14 | 50% | 0.97 | 177° C. | 210° C. |

These copolyesters are all anisotropic above their flow point.

EXAMPLE 15

The following reactants are introduced into an identical reactor to that of Example 1:

| methylhydroquinone diacetate | 93.6 parts |
|---|---|
| adipic acid | 32.85 parts |
| magnesium acetate | 0.103 part |

The acidolysis reaction with adipic acid starts at 220° C. and ends at 234° C., the reaction being carried out under a pressure of 350 mm mercury during the last 15 minutes (yield 94.44 %).

80.63 parts of 1,6-(p,p'-dicarboxydiphenoxy)-hexane are added and the acidolysis reaction resumes at 245° C. and ends at 285° C. after 2 hours 15 minutes. A vacuum is gradually established in the course of 30 minutes and the polycondensation reaction is carried out over a period of 30 minutes at 285° C. under a pressure of 2 mm of mercury.

The copolyester obtained, which contains 50 mol. % of adipic acid relative to the total amount of diacids, possesses an inherent viscosity of 0.54 dlg⁻¹ and a flow point of 225° C., above which it is anisotropic.

EXAMPLE 16

The following reactants are introduced into an identical reaction to that of Example 1:

| methylhydroquinone diacetate | 93.6 parts |
|---|---|
| adipic acid | 32.85 parts |
| magnesium acetate | 0.100 part |

The acidolysis reaction starts at 220° C. and ends at 235° C. after 1 hour 15 minutes, the reaction being carried out under a pressure of 350 mm of mercury during the last 15 minutes. Yield of the reaction: 94.1%.

74.32 parts of 1,4-(p,p'-dicarboxydiphenoxy)-butane are added and the reaction resumes at 241° C. and ends at 285° C. after 2 hours 15 minutes. After gradually lowering the pressure in the course of 30 minutes, the polycondensation reaction is carried out over a period of 30 minutes at 285° C. under a pressure of 2 mm of mercury.

The copolyester thus obtained has an inherent viscosity of 1.03 dlg$^{-1}$ and a flow point of 294° C., above which it is anisotropic.

What is claimed is:

1. A high molecular weight shapeable thermotropic copolyester having (I) an inherent viscosity of at least 0.5 measured on a solution containing 0.5 g/100 cm$^3$ in a solvent mixture 50/50 by volume of p-chlorophenol/1,2-dichloroethane; (II) a flow point which is at least equal to 150° C., and (III) consisting essentially of units of the formulae:

$$(-O-X_1-O-)_a, (-O-X_2-O-)_b,$$
$$(-O-X_3-O-)_c, -CO-Y-CO-,$$
$$\text{and} -CO-Z-CO-,$$

wherein $X_1$ is a paraphenylene radical monosubstituted with a member selected from the group consisting of methyl, ethyl, chloro, and bromo; $X_2$ is an unsubstituted 1,4-phenylene radical; and $X_3$ is (1) a 1,4-phenylene radical disubstituted with two identical members selected from the group consisting of methyl, ethyl, chloro, and bromo; (2) 4,4,'-diphenylene in which each aromatic nucleus may be substituted with a member selected from the group consisting of methyl, ethyl, chloro, and bromo; or (3) a p,p'-diphenylene ether radical in which each aromatic nucleus may be substituted with a member selected from the group consisting of methyl, ethyl, chloro, and bromo, where $$0.4 \leq a \leq 1$$

$$0 \leq b \leq 0.6$$

$$0 \leq c \leq 0.1 \text{ and}$$

$$a+b+c=1;$$

Y is selected from the group consisting of 1,4-phenylene, 1,4-cyclohexylene, a radical containing two 4,4'-diphenylene groups joined to one another by a single bond or an acyclic chain containing up to 8 carbon atoms and zero, 1 or 2 hetero-atoms, and a divalent aromatic radical containing at least two fused phenyl nuclei, in which radical the bonds attached to the carbonyl groups are opposite and parallel; and Z represents a radical $-(CH_2)_n-$, in which $3 \leq n \leq 0$, the molar ratio of $Z/Y+Z$ being between 0.2 and 0.5.

2. A copolyester according to claim 1, having an inherent viscosity of more than 0.6 dlg$^{-1}$.

3. A copolyester according to claim 1, having a flow point of between 180° and 300° C.

4. A copolyester according to claim 1, wherein the radical Y is chosen from amongst 1,4-phenylene, 1,4-cyclohexylene, 4,4'-diphenylene, 2,6-naphthylene, 1,2-(p,p'-diphenoxy)-ethane, 1,4-(p,p'-diphenoxy)-butane, or 1,6-(p,p'-diphenoxy)-hexane radicals.

5. A copolyester according to claim 1, wherein the radical Z is chosen from amongst trimethylene, tetramethylene, or octamethylene radicals.

6. A copolyester according to claim 1, wherein the radical $X_1$ is chosen from amongst methyl-1,4-phenylene or chloro-1,4-phenylene radicals.

7. A copolyester according to claim 1, wherein Y is the 1,4-phenylene radical, Z is the tetramethylene radical, and $X_1$ is the methyl- or chloro-1,4-phenylene radical.

8. A film, thread or other molded article of the copolyester according to claim 1.

9. The film, thread or other molded article according to claim 8, which has been subjected to a heat treatment in the relaxed state after said film, thread or other molded article has been shaped to increase the initial orientation thereof.

* * * * *